UNITED STATES PATENT OFFICE.

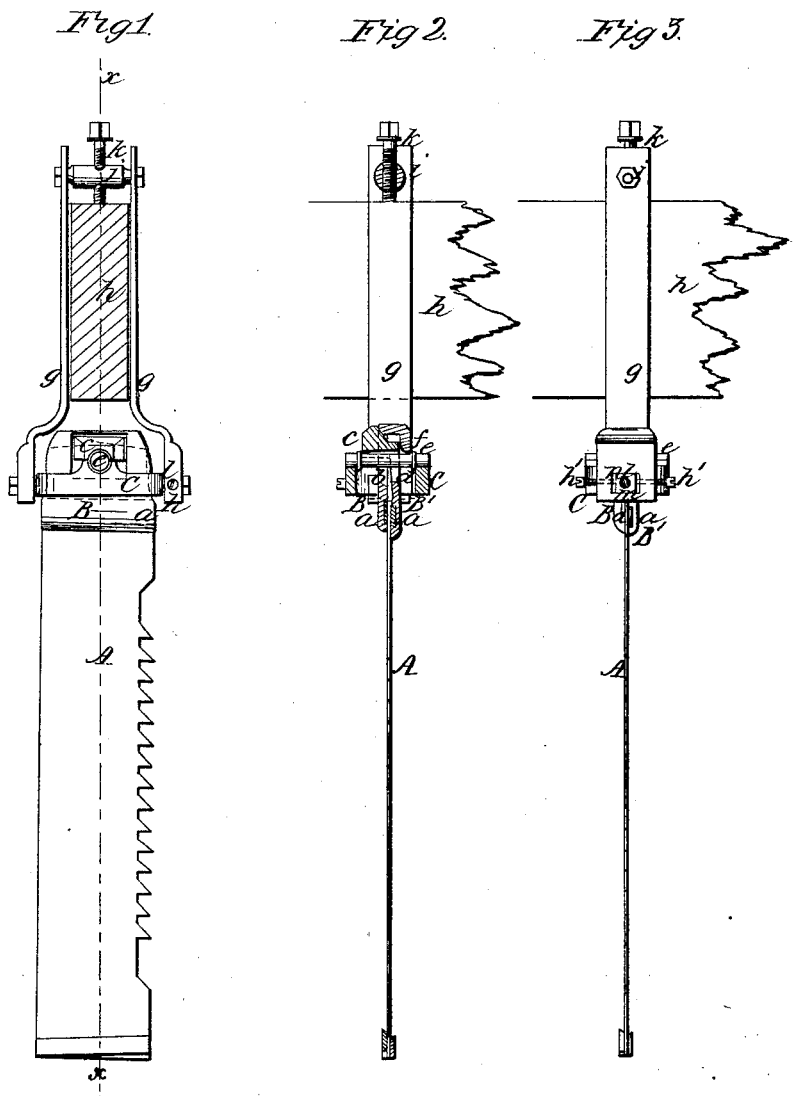

ADDISON CROSBY, OF FREDONIA, NEW YORK, ASSIGNOR TO H. S. STEVENS, OF SAME PLACE.

METHOD OF HANGING RECIPROCATING SAWS.

Specification of Letters Patent No. 23,286, dated March 15, 1859.

*To all whom it may concern:*

Be it known that I, A. CROSBY, of Fredonia, in the county of Chautauqua and State of New York, have invented a new and Improved Saw-Buckle for Securing Reciprocating Saws in Their Frames; and I do hereby declare that the following is a full, clear, and exact description of the same, reference being had to the annexed drawings, making a part of this specification, in which—

Figure 1, is a side view of my invention. Fig. 2, a section of ditto, taken in the line $x$, $x$, Fig. 1. Fig. 3, an end view of ditto.

Similar letters of reference indicate corresponding parts in the several figures.

This invention consists in having the ends of the saw grasped each by two jaws, so connected and arranged within an adjustable swinging frame that a universal joint connection is obtained, and the saw at all times subjected to an equal strain and rendered capable of being set in line with its work with the greatest facility.

To enable others skilled in the art to fully understand and construct my invention I will proceed to describe it.

A, represents an ordinary reciprocating mill saw, and $a$, $a$, are two straps attached to its upper end, and extending its whole width one at each side, said straps being attached to the saw in slightly inclined positions, one being in a reverse position to the other.

B, B', are two jaws or plates which are equivalent in width to the saw A. These jaws are each formed of a flat plate grooved or recessed at their lower ends to receive the straps $a$, $a$, on the saw, the lower edges of the grooves being inclined corresponding inversely with the lower edges of the straps which form a sort of dovetail lock, as shown clearly in Figs. 2 and 3. The upper part of the plate or jaw B, has a hole $b$, made through it to allow a projection $c$, on the plate or jaw B', to pass through, said projection being inclined on its upper surface and forming a bearing for the upper part of the plate or jaw B, as shown clearly in Fig. 2. The plate or jaw B', also has a hole $d$, made in it to allow a small shaft $e$, to pass through, the projection $c$, on plate or jaw B', and a pendent ledge $f$, at the upper part of plate or jaw B, bearing or resting on said shaft.

The shaft $e$, has its bearings in a frame C, which is pivoted between plates $g$, $g$, which clasp the upper cross tie $h$, of the saw sash or frame, the upper end of said plates being connected by a rod $j$, through which a set screw $k$, passes.

From the above description it will be seen that a universal joint connection is obtained and the jaws or plates B, B', are made to grasp the saw by the straining of the same. The "pull" on the plates B, B', tend to draw said plates together and cause them to bind against the saw, in consequence of the upper surface of the projection of plate being inclined, and said projection passing through a hole in the jaw or plate B, the upper part of the plate or jaw B, resting on the inclined surface of $e$. The inclined straps $a$, $a$, which the jaws grasp keep the saw in proper position and equalize the strain, the jaws or plates conforming to the position of the straps.

The front pivot $l$, of the frame C, is fitted in a bearing $m$, in a slot or opening $n$, in the front plate $g$, and a set screw $h'$, is placed in each side of said front plate $g$, opposite the bearing $m$, so that the same may be adjusted either to the right or left, and the saw A, adjusted in line with its work.

Having thus described my invention what I claim as new and desire to secure by Letters Patent, is,

The two jaws or plates B, B', applied to the saw A, connected together and suspended within the swinging or pivoted adjustable frame C, which is attached to the plates $g$, $g$, the whole being arranged as and for the purpose set forth.

ADDISON CROSBY.

Witnesses:
ALLEN HINCKLEY,
A. Z. MADISON.